Sept. 13, 1960 H. M. KOONS 2,952,439
VALVE ASSEMBLY
Filed May 2, 1958
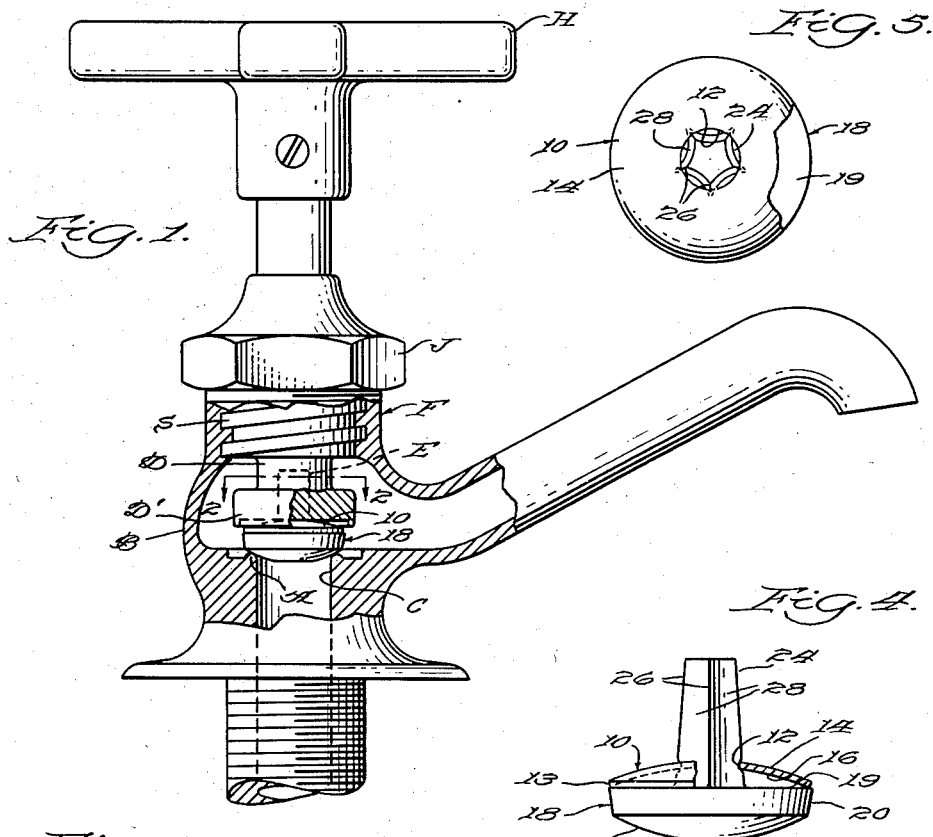
INVENTOR.
Harry M. Koons.
BY
William C. Babcock
Atty United States Patent Office 2,952,439
Patented Sept. 13, 1960

2,952,439

VALVE ASSEMBLY

Harry M. Koons, 1375 Circle Way, Laguna Beach, Calif.

Filed May 2, 1958, Ser. No. 732,738

7 Claims. (Cl. 251—357)

The present invention relates to the field of compression valves or faucets, and more particularly to a faucet valve assembly that may be readily attached to the conventional threaded valve plunger without the use of screws or other means.

The major object of the present valve assembly is to provide an economical unit which requires no screws or the use of hand tools to mount the device on the plunger of a conventional compression valve or faucet that is extremely simple structurally, can be manufactured from standard, commercially available materials, and sold at a sufficiently low price to encourage its widespread use on either old or new valves to assure permanent and trouble-free shut-off of liquid when the valve is placed in the closed position.

Another object of the invention is to supply a valve assembly that is quick and easy to install on the plunger of a conventional compression valve, with which there is little tendency for that surface contacting the valve seat to wear, become grooved, or otherwise damaged, for while the valve assembly rotates with the plunger to a closing position, rotation of the assembly per se immediately ceases upon sealing thereof with the seat. Thereafter it is possible to further compress the head portion of the plunger by rotation thereof.

Yet another object of the invention is to provide a valve assembly, which when mounted on a conventional valve plunger, so cooperates therewith as the plunger is rotated, as to move the assembly into fluid sealing contact with the seat. The washer forming a part of the assembly can deform a resilient head, likewise an element of the assembly, into full contact with the seat irrespective of whether or not the contactable edge portion of the seat is in a plane substantially normal to the longitudinal axis of the plunger.

A still further object of the invention is to furnish an assembly that includes a rigid washer and resilient head which are so related and of such configuration that the head may be deformed and bowed upwardly after contacting the seat as to assure a positive, fluid-tight seal therewith.

A still further object of the invention is to provide a valve assembly including a head from the center of which a stem projects. The stem is formed of a resilient material that is sufficiently rigid as to be self-threading when the stem is forcibly rotated into the tapped bore normally formed in a conventional plunger of a compression valve.

Another object of the invention is to furnish a valve assembly that is susceptible of fabrication from either or any one of the numerous synthetic polymerizable resins commercially available for such purposes, as well as a resin type of rubber that does not deteriorate appreciably when subjected to hot water over prolonged periods.

Yet a further object of the invention is to provide a valve assembly that is unaffected by mineral deposits such as encountered when the device is used in controlling flow of hard water, which assembly is easy to remove from a valve plunger even though the plunger and portions of the assembly may become covered with relatively heavy layers of such mineral deposits.

These and other objects and advantages of the present invention will become apparent from the following description of a preferred form thereof, and from the accompanying drawing illustrating same, in which:

Figure 1 is a side elevational view, partially in cross section, showing the positioning of the valve assembly on the plunger;

Figure 2 is a horizontal cross-sectional view of the valve structure shown in Figure 1, taken on line 2—2 thereof;

Figure 3 is a fragmentary vertical cross-sectional view of that portion of the valve on which the assembly is mounted, showing the head of the assembly in liquid sealing contact with the valve seat.

Figure 4 is a combined side elevational and vertical cross-sectional view of the valve assembly;

Figure 5 is a top plan view of the assembly shown in Figure 4; and

Figure 6 is a perspective view of the valve assembly showing the convex-concave washer which comprises a circular head and a stem extending downwardly from the central portion of the head.

Referring to the drawing for the general arrangement of the invention, it will be seen in Figure 1 embodied in faucet F having the usual retractable and endwise movable valve plunger S threaded therein and controlled by a handle H. An internally disposed circular seat A is formed as a portion of the faucet body B and is in the form of a raised ring that defines the inlet port C. The lower portion of plunger S terminates in a downwardly projecting portion D that is smaller in transverse cross section than the threaded portion thereof, and a circular valve member D′ of substantially larger cross section develops from portion D. A central tapped bore E extends upwardly through valve member D′ and portion D, and this bore is normally threadedly engaged by a screw for maintaining a gasket (not shown) on the lower face of valve member D′. This gasket is brought into fluid-sealing contact with seat A when plunger F is rotated in an appropriate direction by means of handle H. The threaded upper exterior portion of body B is threadedly engaged by a bonnet J, as shown in Figure 1.

The present invention which will hereinafter be described in detail is used in conjunction with a conventional valve of the structure above described by first unscrewing the bonnet J from body B and then rotating plunger S by use of handle H to remove the plunger and the projecting portion D and valve member D′ from the confines of the body. The gasket normally disposed on the lower face of valve member D′ is removed therefrom by loosening the screw previously mentioned. Valve plunger S, projecting portion D and valve member D′ are then in condition to have the invention mounted thereon.

As can best be seen in Figures 3, 4 and 6, the valve assembly of the present invention includes a circular washer 10, preferably fabricated from brass or other corrosion resistant material, in which a central opening 12 is formed. This washer is of inverted dish-shaped configuration having a circumferentially extending outer edge portion 13, an upper convex surface 14, and a lower concave surface 16. The diameter of washer 10 is substantially greater than the diameter of seat A for reasons that will hereinafter become apparent. A head 18 is provided that is preferably fabricated from a resilient material such as rubber, neoprene, or any one of a number of other commercially available polymerizable resinous materials that are capable of withstanding high temperatures without deterioration for long periods of time.

Head 18 (Figures 3, 4 and 6) is defined by an upper circular surface 19 that is preferably flat, from the outer circumferential edge of which a side wall 20 extends downwardly and develops into a lower surface 22. At the junction of surface 22 with the lower extremity of side wall 20 a ring-shaped downwardly and inwardly tapering section 22a is defined that is adapted to contact seat A (Figure 3).

A stem 24 projects upwardly from the center of surface 19 and is preferably formed as an integral part of head 18. Stem 24 is defined by a number of longitudinally extending fins 26 which are separated by longitudinally extending surfaces 28 of concave transverse configuration. Although not essential, it has been found advantageous to form stem 24 with five fins 26.

Installation of this valve assembly is extremely simple. After removal of the screw and gasket previously mentioned and not shown in the drawing, from valve member D', the valve assembly is arranged as shown in Figure 3 and the stem 24 forcibly rotated upwardly within tapped bore E. The transverse cross section of stem 24 is such that fins 26 are transversely compressed by threads 30 of bore E as the stem is rotated and forced upwardly therein. Due to the resiliency of the material from which stem 24 is fabricated, this forceful rotation causes formation of complementary threads in the fins 26 that are disposed between threads 30, which permit rotation of head 18 relative to plunger S, but prevent any appreciable downward longitudinal movement of the stem relative thereto. After the valve assembly has been disposed on plunger S as described, the plunger is threaded into valve body B (Figure 1) and the bonnet J replaced thereon. The valve is then ready for use in the control of fluid flow therethrough.

Inasmuch as there is substantial frictional engagement between the stem 24 and threads 30, the head 18 and stem 24 will normally tend to rotate with the valve member D', unless a resisting force is applied to the head to prevent such rotation. When head 18 has been moved downwardly a sufficient distance by rotation of handle H, the ring-shaped section 22a of the head contacts ring A and sufficient frictional resistance is provided thereby to cause head 18 and stem 24 to remain stationary, yet permit further rotation of the plunger relative thereto. Of course, further rotation of plunger S in the direction in which head 18 is moved to bring it into contact with seat A will cause downward movement of washer 10 whereby the circumferential edge of the washer exerts a compressive force on the outer periphery of head 18. It will be particularly noted in Figure 3 that the contact between seat A and head surface 22a is effected inwardly a substantial distance from the circumferential edge of side wall 20. Therefore, due to the positioning of seat A relative to head 18 and the force exerted on the outer upper extremity of the head, the head is so compressed that the lower surface 22a assumes the bowed configuration 22aa shown in phantom line in Figure 3, and the normally flat surface 19 assumes the convex curved surface 19' shown in phantom line in the same figure. The upwardly bowed configuration thus obtained has been found highly advantageous in that it will always effect a fluid-tight seal at the contact area between seat A and section 22a, irrespective of whether or not the upper contactable surface of the seat is in a plane normal to the longitudinal axis of stem 24.

Cessation of rotation of head 18 and stem 24 upon contact with seat A is of utmost importance for there is no rotational movement between head and seat to abraid the lower surface of the seat or cause same to become grooved, even after extensive use of the invention in the valve. The concave configuration of surfaces 24 minimizes the area portion of the stem in which grooves are formed when installed in bore E and lessens the frictional resistance encountered as well as the manual force required to place the invention in operative position.

Removal of the valve assembly from the valve is extremely simple for it is merely the reverse of the installation procedure previously described. However, due to the manner in which the invention operates after installation and the minimum of frictional action to which it is subjected, there is little or no tendency to wear, and normally the invention will last the life of the valve and give trouble-free service.

For ease of installation in tapped bore E, it has been found desirable to have the fins 26 taper upwardly and inwardly slightly as shown in Figures 4 and 6 of the drawings. This slight taper provides a free end portion of the stem that is the same or slightly smaller in transverse cross section than the transverse area of the bore. The convex configuration of surface 14 of washer 10 is also of the utmost importance, for it is designed to present but a minimum of area contact between the washer and valve member D'. Due to this small area of contact, the valve member D' and plunger D turn easily relative to the washer 10, head 18 and stem 24, after the head is seated in a closing position as shown in Figure 3.

It will be obvious to those skilled in the art that various changes may be made in the invention without departing from the spirit and scope thereof, and therefore the invention is not limited by that which is shown in the drawing and described in the specification, but only as indicated in the appended claims.

I claim:
1. A liquid shut-off valve assembly capable of being mounted without the use of tools on the plunger of an upwardly extending compression valve wherein a tapped bore is formed, including: a head fabricated from a resilient material which is defined by a flat circular surface, a side wall extending from the circumferential edge of said flat surface that develops into a surface opposite said flat surface having an outer portion which tapers inwardly; a stem projecting from the center of the flat surface of said head and integrally formed therewith, said stem being formed from a sufficiently resilient material that threads may be formed on said stem upon forcible rotation of said stem into a tapped bore; and a rigid convex-concave circular washer having a central opening formed therein through which said stem projects, with the concave surface of said washer being disposed closest to said head, and the circumferential edge of said washer contacting said flat surface of said head.

2. A shut-off valve assembly as set forth in claim 1 wherein said stem is formed with a plurality of longitudinally extending fins on the exterior surface thereof that are spaced substantially equidistant from one another and are adapted to have said threads formed therein.

3. A shut-off valve assembly as set forth in claim 2 wherein the exterior longitudinally extending surfaces of said stem are concave in transverse configuration with the major portions of said surfaces being disposed between said fins and not in contact one with the other.

4. A shut-off valve assembly as set forth in claim 3 wherein the transverse cross section of said stem is substantially pentagonal in shape.

5. A liquid shut-off valve assembly capable of being mounted without the use of tools on the plunger of an upwardly extending compression valve wherein a tapped bore is formed, including: a head fabricated from a resilient material that is defined by a flat substantially circular surface, a side wall extending from the circumferential edge of said flat surface, and a surface opposite said flat surface which develops from the termination of said side wall, said surface opposite said flat surface having an outer portion that tapers inwardly and is capable of sealingly engaging said seat inwardly from the outer periphery of said outer portion; a stem projecting from the center of the flat surface of said head and integrally formed therewith, said stem being formed from a sufficiently resilient material that threads may be formed on said stem upon forcible rotation of said stem into a tapped bore; and a rigid convex-concave circular washer having a central opening formed therein through which said stem projects, with the concave surface of said washer being disposed closest to said head, and the circumferential edge of said washer contacting said flat surface of said head slightly inwardly from the circumferential edge thereof, with said washer capable of deforming said head when force is applied to the surface opposite to said flat surface.

6. A shut-off valve assembly as defined in claim 5 wherein said stem is formed with a plurality of longitudinally extending fins on the exterior surface thereof that are spaced substantially equidistant from one another and are adapted to have said threads formed therein.

7. A shut-off valve assembly as defined in claim 6 wherein the transverse cross section of said stem is substantially pentagonal in shape.

References Cited in the file of this patent

UNITED STATES PATENTS

| | | |
|---|---|---|
| 2,081,616 | Diamond | May 25, 1927 |
| 2,194,961 | Walker | Mar. 26, 1940 |
| 2,823,006 | Hare | Feb. 11, 1958 |
| 2,851,243 | Tannock | Sept. 9, 1958 |